J. H. P. FARRAR & A. HECKER.
INTEREST CALCULATOR.
APPLICATION FILED FEB. 24, 1910.
991,204.
Patented May 2, 1911.
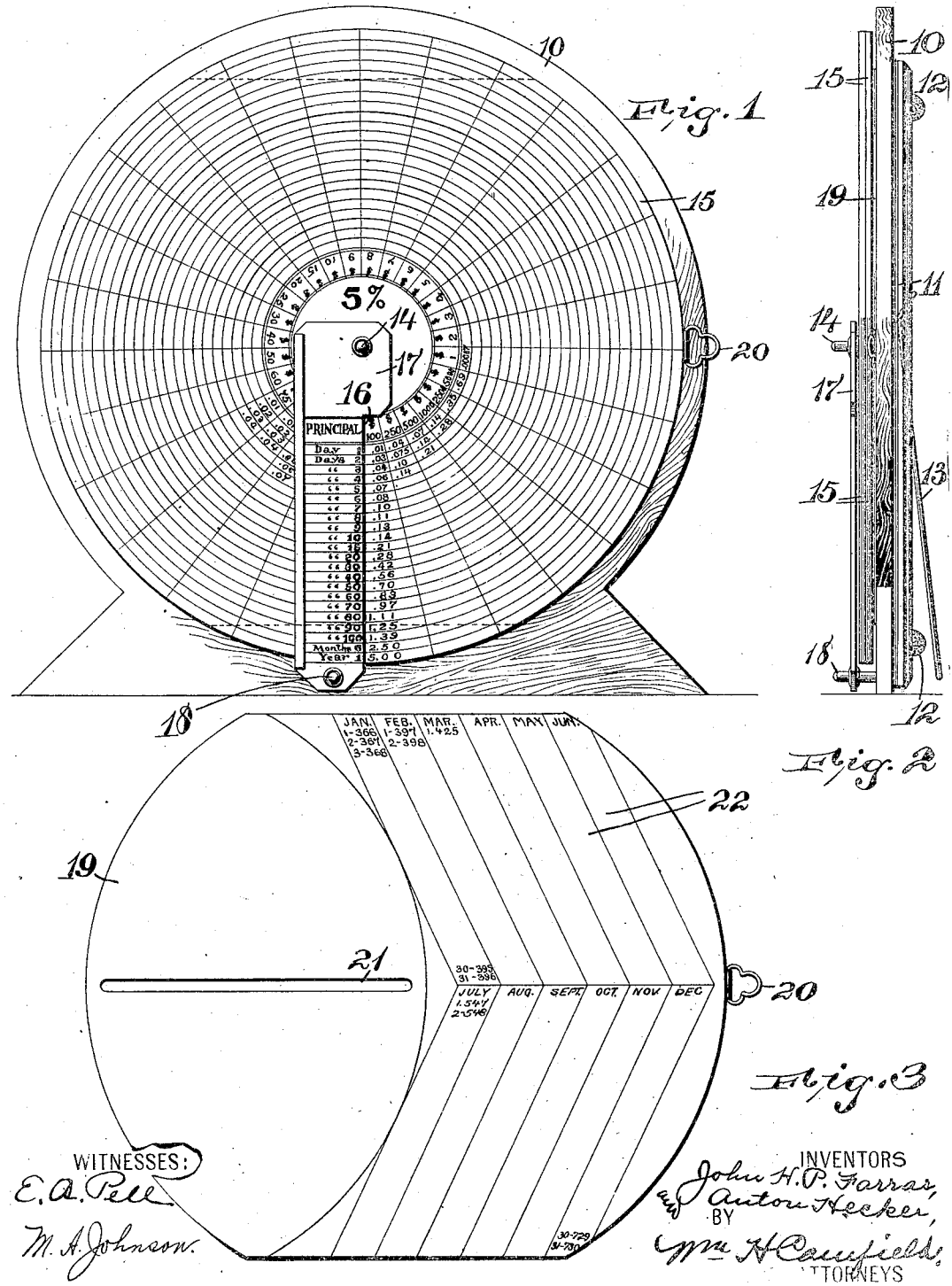

UNITED STATES PATENT OFFICE.

JOHN H. P. FARRAR AND ANTON HECKER, OF NEWARK, NEW JERSEY.

INTEREST-CALCULATOR.

991,204.  Specification of Letters Patent.  Patented May 2, 1911.

Application filed February 24, 1910. Serial No. 545,730.

*To all whom it may concern:*

Be it known that we, JOHN H. P. FARRAR and ANTON HECKER, citizens of the United States, residing at Newark, in the county of Essex and State of New Jersey, have invented certain new and useful Improvements in Interest-Calculators; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a calculator and one particularly adapted for computing interest for any period of time for any amount, and at different rates of interest.

The device consists of a suitable support with reversible, rotatable disks which are removably placed therein, and a finger or leaf which is detachably placed on the disks and is ruled into subdivisions or lines which register with the subdivisions or concentric lines on the disks. The finger contains the times for which interest is desired, the principal and the interest for the times desired being radially arranged in their respective places on the disks. We also place a time-indicating slide on the support which can be easily and quickly slid into and from view.

The invention is illustrated in the accompanying drawing, in which—

Figure 1 is a front view of the device, and Fig. 2 is a side view of the same. Fig. 3 is a face view of the time-indicating sheet.

The device comprises a support formed of a tablet 10, preferably of wood having strips 11 arranged on the back thereof, these strips being supplied with buttons 12 of soft or resilient material to protect a desk or other furniture on which it is laid. A wire 13 can be hinged to lie between the strips 11, when the device is used flat, and be extended to form, with the tablet, an easel, when it is desired to use the device in an upright position. A central pivotal pin 14 projects from the face of the tablet 10 and disks 15 are removably arranged on the pin 14 and adapted to rotate thereon. The disks are printed, preferably, on both sides so that more matter can be placed thereon and have radial columns having the principals on which interest is computed arranged in a conspicuous place in each column, preferably at the top, or toward the center when the lower part of the disk is used. In concentric relation with each other and radial relation with their respective principals are the amounts representing the interest for a specified time, these interest amounts making up the radial columns and adapted to be swung adjacent to the edge 16 of a leaf or finger 17, which edge is so disposed on the finger that it is radial and is alined with the radial columns as they are brought successively adjacent to it. The finger is provided with subdivisions or headings that identify the principal and the time for which the interest amounts are computed. The finger is removable, being perforated at one end to receive the pin 14 and at the other end to receive an outside pin 18. Thus when the interest for 10 days on $100.00 at 5% is desired, the disk for 5% is rotated till the column having $100.00 as the principal is rotated to bring it adjacent to the edge 16 of the finger 17. The time-indicating subdivisions register with the concentrically alined amounts for their respective times, and by running the finger down to 10 days we find the interest in the interest column to be fourteen cents. We have not filled all the column of numbers, but enough to indicate what they would contain when complete.

We place a time computing slide 19 on the tablet 10 and preferably under the disks 15, the slide having a suitable handle 20 by which it can be slid in and out. The disk has a slot 21 which fits over the pin 14 and limits the movement of the slide, the slide having an edge to conform to the disks when the slide is in. When the slide is drawn out it brings to view columns 22 as of a calendar, these columns being preferably arranged one for each month and having the day of its month followed by the number of days from the first day of the year preceding, such as "Jan. 1–366" or "Dec. 31–730", these columns not being illustrated complete, but enough being shown to indicate how they would be arranged. This slide will enable the number of days to be found, between the day of one month to the day of some month following, with quickness and accuracy.

The device is compact and light and is well adapted for office work, being constructed to be set up vertically or laid down flat.

The disks are preferably printed on both sides and since they are removable, both sides can be used, being preferably printed on the opposite sides with different rates of interest computed on the face. We prefer to use two disks, one having, on one side, a rate at 4% and on the other side at 5%, and the second disk has its two sides provided with a rate at 6% and 7% respectively. These different faces will then give the rate for from 2% to 14%, since the different and odd rates can be easily computed from the others, for instance, 2% and 1% can be taken from the 4% disk without any trouble. Of course it will be understood that we may make disks computed at any rate, but we prefer to use them as above outlined.

Having thus described our invention, what we claim is:—

1. A device for computing interest comprising a support formed of a tablet, a pin projecting from the face of the support, an annular disk perforated in its center and adapted to be placed on the pin and rotate thereon, an outside pin projecting from the face of the tablet beyond the periphery of the disk, a finger having a column of subdivisions on one edge, the finger being provided with perforations, one near each end, the perforations being so disposed that they are adapted to bring the edge with the subdivisions radial with the pin on which the disk rotates, the finger being adapted to be readily removed from the pins by being slid therefrom, and radial columns on the disk adapted to be brought in register with the subdivisions on the edge of the finger.

2. A device for computing interest comprising a support formed of a tablet, a pin projecting from the face of the support, an annular disk perforated in its center and adapted to be placed on the pin and rotate thereon, an outside pin projecting from the face of the tablet beyond the periphery of the disk, a finger having a column of subdivisions on one edge, the finger being provided with perforations, one near each end, the perforations being so disposed that they are adapted to bring the edge with the subdivisions radial with the pin on which the disk rotates, the finger being adapted to be readily removed from the pins by being slid therefrom, radial columns on the disk adapted to be brought in register with the subdivisions on the edge of the finger, a slide between the disk and the support, the slide having a slot extending approximately half way across the same, the slot being adapted to receive the central pin and acting to limit the sliding motion of the slide on the pin, a projection on the slide for manipulating it, and columns for a calendar arranged on the slide and occupying substantially the unslotted portion of the strip and adapted to be placed in view when uncovered by the disk when the slide is at its outward limit of movement.

3. A device for computing interest comprising a support having a central pin projecting therefrom, an annular disk placed on the pin and adapted to be removed therefrom and arranged to rotate thereon, an outside pin on the support beyond the periphery of the disk, a finger perforated near its ends, the perforations being adapted to fit over the two pins, subdivisions on the disk, subdivisions on the finger, the subdivisions being adapted to be brought successively in register when the disk is rotated, a slide between the disk and the support, the slide having rounded side edges to be placed in register with the edges of the disk, the slide being slotted for substantially one-half its width, the slide being adapted to receive the central pin and acting to limit the sliding motion of the slide on the pin, a projection on the slide for manipulating it, and columns containing material to be used in conjunction with the matter on the finger and on the disk, the columns occupying that portion of the slide which is uncovered when the slide is slid to its outward limit of movement.

In testimony, that we claim the foregoing, we have hereunto set our hands this 19th day of February 1910.

JOHN H. P. FARRAR.
ANTON HECKER.

Witnesses:
WM. H. CAMFIELD,
E. A. PELL.

---

Copies of this patent may be obtained for five cents each, by addressing the "Commissioner of Patents. Washington, D. C."